United States Patent
Anjomshoa et al.

(10) Patent No.: US 10,755,211 B2
(45) Date of Patent: Aug. 25, 2020

(54) WORK SCHEDULE CREATION BASED ON PREDICTED AND DETECTED TEMPORAL AND EVENT BASED INDIVIDUAL RISK TO MAINTAIN CUMULATIVE WORKPLACE RISK BELOW A THRESHOLD

(71) Applicant: INTERNATIONAL BUSINESS MACHINES CORPORATION, Armonk, NY (US)

(72) Inventors: Hamideh Anjomshoa, Melbourne (AU); James R. Kozloski, New Fairfield, CT (US); Timothy Lynar, Melbourne (AU); John Wagner, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1178 days.

(21) Appl. No.: 14/971,373

(22) Filed: Dec. 16, 2015

(65) Prior Publication Data

US 2017/0178050 A1 Jun. 22, 2017

(51) Int. Cl.
 *G06Q 10/06* (2012.01)
(52) U.S. Cl.
 CPC . *G06Q 10/063116* (2013.01); *G06Q 10/0635* (2013.01)
(58) Field of Classification Search
 CPC ............... G06Q 10/063116; G06Q 10/0635
 See application file for complete search history.

(56) References Cited

U.S. PATENT DOCUMENTS

| 8,075,484 | B2 * | 12/2011 | Moore-Ede | B60K 28/06 600/300 |
| 8,428,993 | B2 | 4/2013 | Lee | |
| 9,129,158 | B1 * | 9/2015 | Medasani | G06K 9/00335 |
| 10,062,042 | B1 * | 8/2018 | Kelly | G06Q 10/063112 |
| 2005/0151660 | A1 * | 7/2005 | Mou | G08B 5/22 340/679 |
| 2008/0121168 | A1 * | 5/2008 | Ryznar | G05B 19/41805 116/201 |
| 2008/0231461 | A1 * | 9/2008 | Sanchez | B60K 28/066 340/575 |
| 2009/0089108 | A1 * | 4/2009 | Angell | G06Q 10/00 705/7.28 |

(Continued)

OTHER PUBLICATIONS

Krüger, Jörg, Terje K. Lien, and Alexander Verl. "Cooperation of human and machines in assembly lines." CIRP annals 58.2 (2009): 628-646. (Year: 2009).*

(Continued)

*Primary Examiner* — Matthew S Gart
*Assistant Examiner* — Hamzeh M Obaid
(74) *Attorney, Agent, or Firm* — Tutunjian & Bitetto, P.C.; Anthony Curro

(57) ABSTRACT

A method and system are provided. The method includes generating, by a server having a processor, temporal and event based risk predictions for each of a plurality of workers at a workplace, using a prediction window of a work shift. The method further includes creating, by the server having the processor, a work schedule for the plurality of workers that is optimized to maintain a cumulative workplace risk below a given threshold, based on the temporal and event based risk predictions.

19 Claims, 8 Drawing Sheets

(56) References Cited

U.S. PATENT DOCUMENTS

| | | | | |
|---|---|---|---|---|
| 2009/0132332 | A1* | 5/2009 | Belenky | G06Q 10/109 |
| | | | | 705/7.13 |
| 2010/0019921 | A1* | 1/2010 | Kreiner | G08B 25/009 |
| | | | | 340/4.3 |
| 2010/0241464 | A1* | 9/2010 | Amigo | G06Q 40/08 |
| | | | | 705/4 |
| 2011/0259258 | A1* | 10/2011 | DePiero | E02F 9/0858 |
| | | | | 116/200 |
| 2011/0301433 | A1* | 12/2011 | Sadowsky | A61B 5/165 |
| | | | | 600/300 |
| 2012/0316845 | A1* | 12/2012 | Grey | G06Q 10/06398 |
| | | | | 703/2 |
| 2014/0074546 | A1 | 3/2014 | Poletti et al. | |
| 2014/0330132 | A1* | 11/2014 | Raskin | A61B 5/02427 |
| | | | | 600/479 |
| 2015/0074036 | A1* | 3/2015 | Lenz | G06N 5/043 |
| | | | | 706/52 |
| 2015/0148616 | A1* | 5/2015 | Van Dongen | G16H 50/30 |
| | | | | 600/300 |

OTHER PUBLICATIONS

Malik, R., "Decision Support Tool for Dynamic Workforce Scheduling in Manufacturing Environments", S.B, Computer Science and Engineering and Mathematics, MIT (2012) Submitted to the Department of Electrical Engineering and Computer Science in partial fulfillment of the requirements for the degree of Master of Engineering in Electrical Engineering and Computer Science at the Massachusetts Institute of Technology, May 2013, 117 Pages.

\* cited by examiner

WORK SCHEDULE CREATION BASED ON PREDICTED AND DETECTED TEMPORAL AND EVENT BASED INDIVIDUAL RISK TO MAINTAIN CUMULATIVE WORKPLACE RISK BELOW A THRESHOLD

BACKGROUND

Technical Field

The present invention relates generally to worker safety and, in particular, to work schedule creation based on predicted and detected temporal and event based individual risk to maintain cumulative workplace safety risk below a threshold.

Description of the Related Art

Worldwide there are around 350,000 workplace fatalities and 270 million workplace injuries annually. According to the National Safety Council, in the U.S. alone, this results in $750 billion in lost wages and productivity, medical expenses, administrative costs, motor vehicle damage, employer's uninsured costs and fire loss. This includes about 4,400 worker deaths due to job injuries, close to 50,000 deaths due to work-related injuries, and approximately 4 million workers who suffered non-fatal work related injuries or illnesses. An estimated 14 million people worked in the U.S. manufacturing sector in 2010, and there were 329 deaths due to job injuries, with $1.4 million in costs associated with each death, and 127,140 non-fatal injuries involving days away from work. In 2008, contact with objects and equipment was the leading cause of death (resulting in 116 deaths) and the leading cause of non-fatal injuries involving days away from work (60,430 cases) in the U.S. manufacturing sector. Overexertion is the second leading cause of non-fatal injuries involving days away from work.

Today factory workers self-assess risk in different situations and with different machines based largely on their prior experience. However, this approach is insufficient in many situations. For example, relatively new workers, or even veteran workers who have recently been tasked with working with new equipment, may not have the experience necessary to properly evaluate their risk. Thus, there is a need for improved workplace accident avoidance.

SUMMARY

According to an aspect of the present principles, a method is provided. The method includes generating, by a server having a processor, temporal and event based risk predictions for each of a plurality of workers at a workplace, using a prediction window of a work shift. The method further includes creating, by the server having the processor, a work schedule for the plurality of workers that is optimized to maintain a cumulative workplace risk below a given threshold, based on the temporal and event based risk predictions.

According to another aspect of the present principles, a computer program product is provided for workplace schedule generation. The computer program product includes a non-transitory computer readable storage medium having program instructions embodied therewith. The program instructions are executable by a computer to cause the computer to perform a method. The method includes generating, by a server having a processor, temporal and event based risk predictions for each of a plurality of workers at a workplace, using a prediction window of a work shift. The method further includes creating, by the server having the processor, a work schedule for the plurality of workers that is optimized to maintain a cumulative workplace risk below a given threshold, based on the temporal and event based risk predictions.

According to yet another aspect of the present principles, a system is provided. The system includes a server having a processor, for generating temporal and event based risk predictions for each of a plurality of workers at a workplace using a prediction window of a work shift, and creating a work schedule for the plurality of workers that is optimized to maintain a cumulative workplace risk below a given threshold based on the temporal and event based risk predictions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to work schedule creation based on predicted and detected temporal and event based individual risk to maintain cumulative workplace risk below a threshold.

In an embodiment, the present principles are utilized with respect to a cloud deployable "cognitive suite of workplace hygiene and injury predictors" (abbreviated as "Cognitive WHIP"). In an embodiment, the present principles provide a system and method by which the Cognitive WHIP outputs (predictions) are examined over a prediction window of a worker's shift, and the scheduling of activities during the worker's shift is automatically generated to minimize the Cognitive WHIP's prediction of risk related to industrial hygiene or injury related events. Scheduling may take into account any of the following: time of day; proximity of the worker to other workers; equipment, or environments;

worker performance patterns over the shift and relative to breaks and meals, and so forth.

In an embodiment, the present principles are applied to optimize the allocation, ordering and timing of all activities across all workers and incorporate operational constraints during a shift. In an embodiment, the optimization is a global operation that considers all activities, workers and constraints simultaneously to reduce the overall risk of the entire shift.

Figure 1:
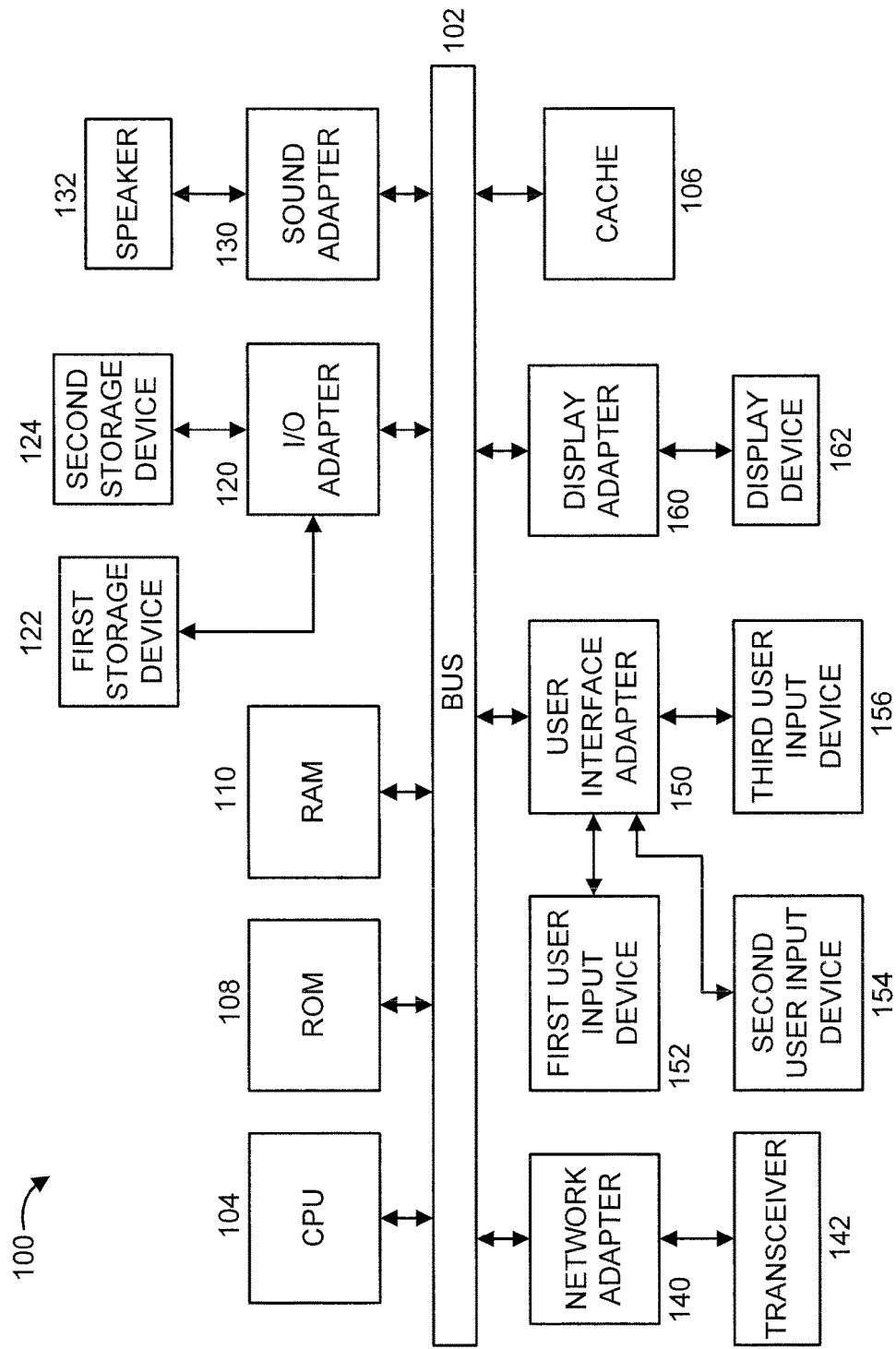
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. It is to be appreciated that the terms processors and controllers can be used interchangeably herein. These and other variations of the processing system 100 are readily contemplated by one of ordinary skill in the art given the teachings of the present principles provided herein.

Figure 2:
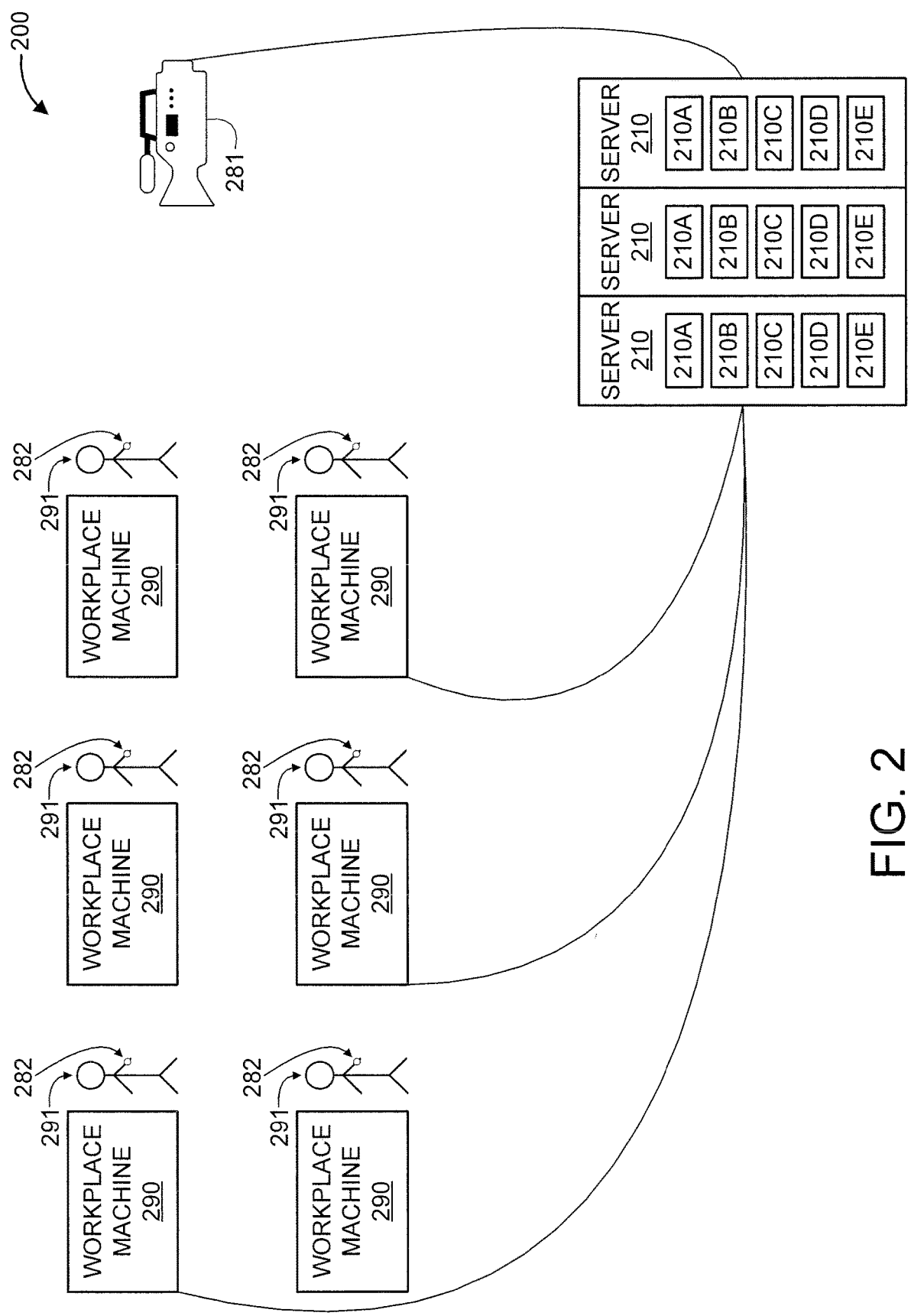
FIG. 2 shows an exemplary system 200 for work schedule creation based on predicted and detected temporal and event based individual risk to maintain cumulative workplace risk below a threshold, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
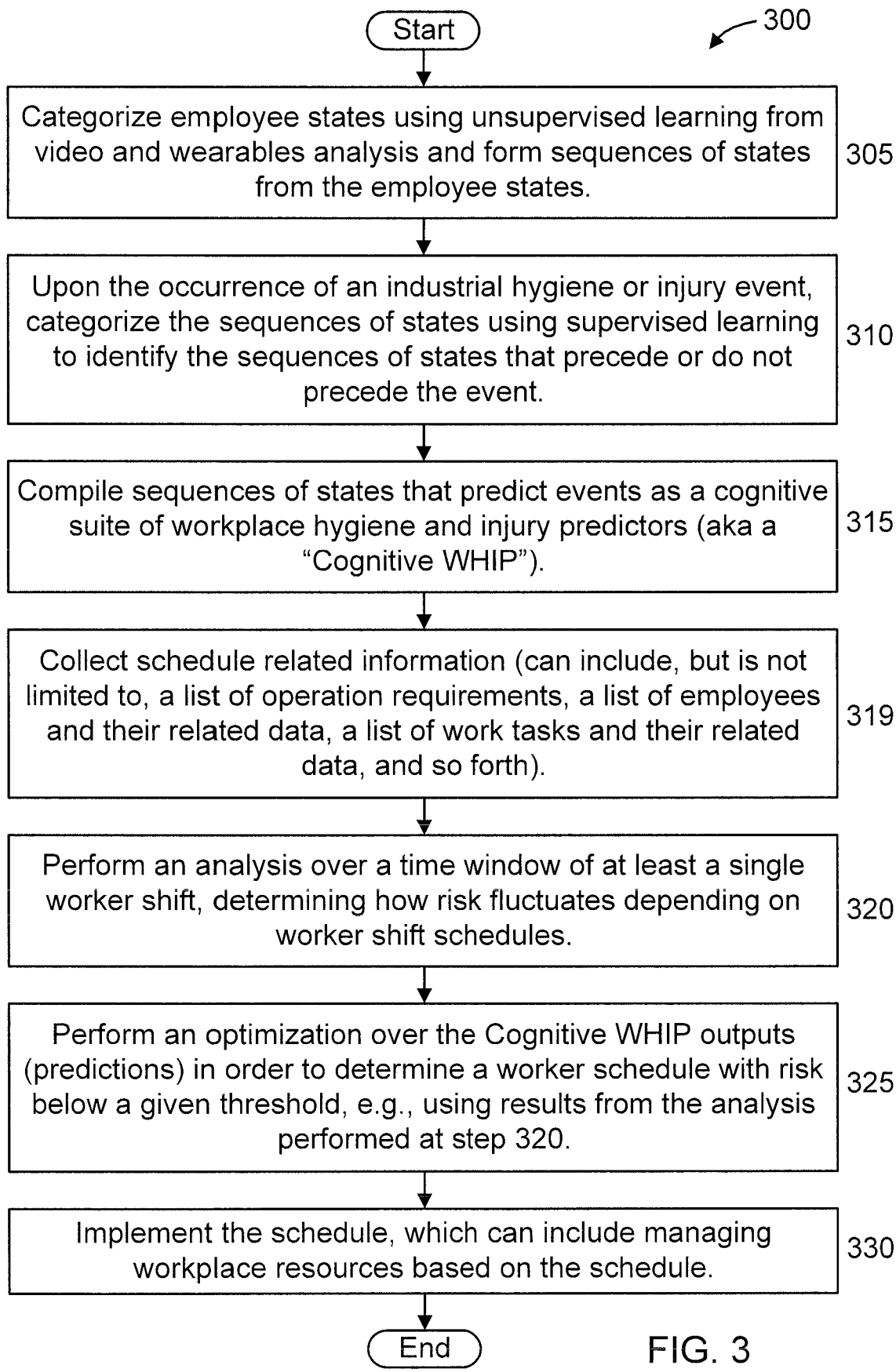
FIG. 3 shows an exemplary method 300 for work schedule creation based on predicted and detected temporal and event based individual risk to maintain cumulative workplace risk below a threshold, in accordance with an embodiment of the present principles.
Figure 4:
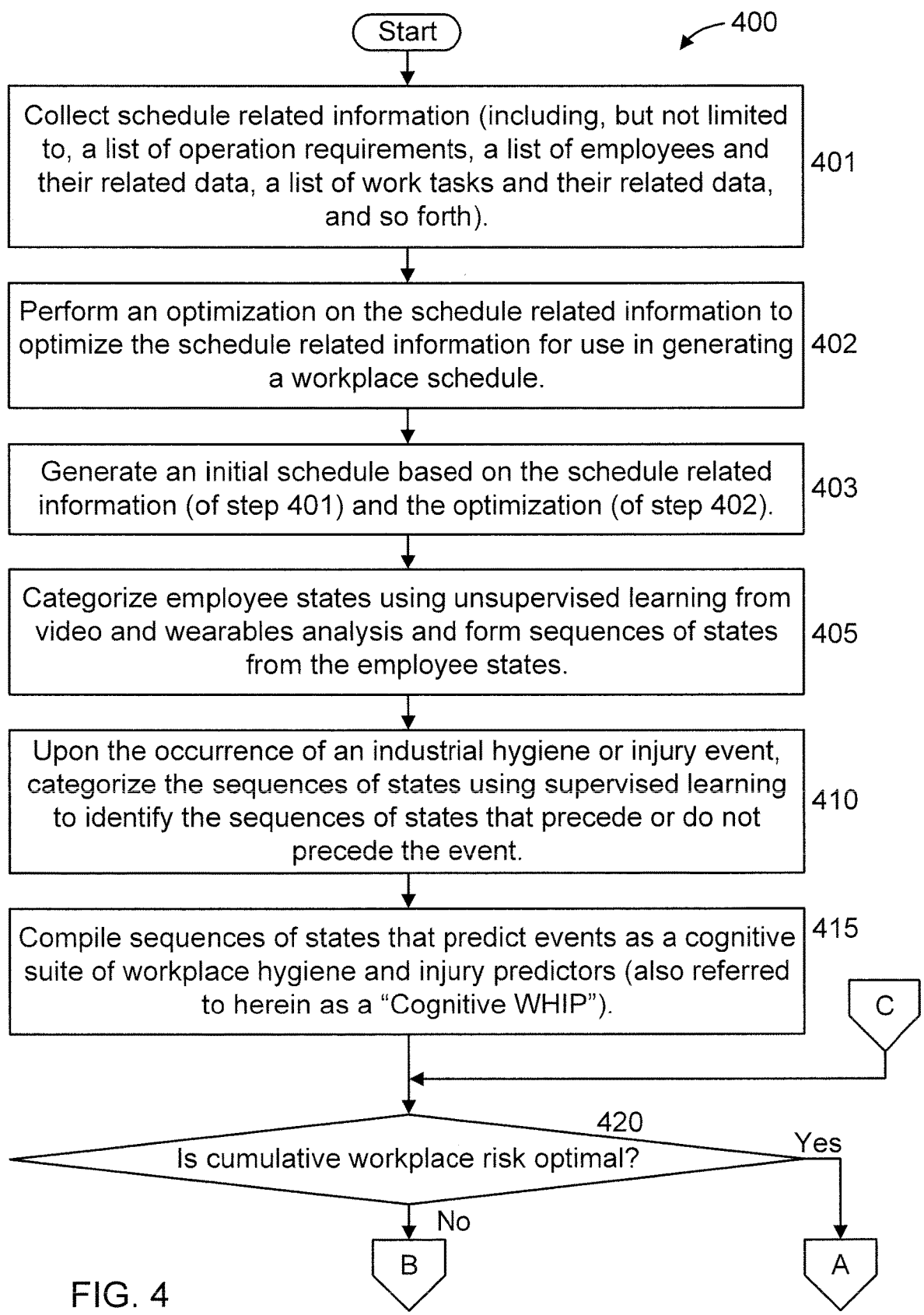
FIGS. 4-5 show another exemplary method 400 for work schedule creation based on predicted and detected temporal and event based individual risk to maintain cumulative workplace risk below a threshold, in accordance with an embodiment of the present principles.
Figure 5:
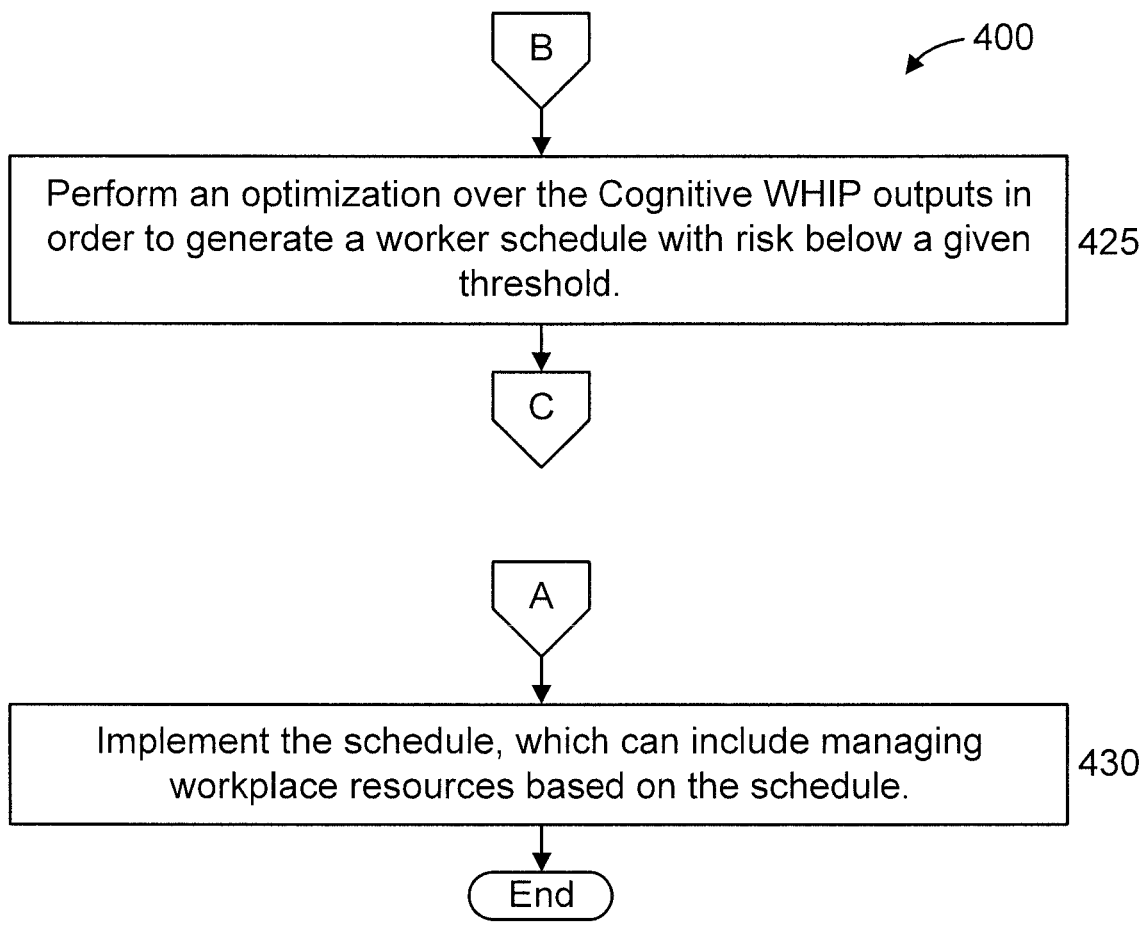

Further, it is to be appreciated that processing system 100 may perform at least part of the method described herein including, for example, at least part of method 300 of FIG. 3 and/or at least part of method 400 of FIGS. 4-5. Similarly, part or all of system 200 may be used to perform at least part of method 300 of FIG. 3 and/or at least part of method 400 of FIGS. 4-5.

FIG. 2 shows an exemplary system 200 for work schedule creation based on predicted and detected temporal and event based individual risk to maintain cumulative workplace risk below a threshold, in accordance with an embodiment of the present principles.

The system 200 is shown with respect to an operational environment in which it can be utilized, in accordance with an embodiment of the present principles. Accordingly, a set of workplace machines 290 are generally shown in FIG. 2 as blocks. However, these machines can be any type of machine found in a workplace environment (e.g., a factory, a plant, and so forth). In an embodiment, the workplace environment can involve manufacturing, assembly, and so forth. Each of the workplace machines 290 has at least one employee 291 operating the same.

The system 200 includes one or more servers (hereinafter "servers") 210. Each of the servers 210 can include a processor or controller (hereinafter "controller") 210A, memory 220B, workplace hygiene and injury predictor 220C, a workplace schedule generator 220D, and a workplace resource manager 220E.

In the embodiment of FIG. 2, the servers 210 are shown local to the workplace environment. In another embodiment, the servers 210 can be in the cloud. In yet another embodiment, the servers can be both local and remote, such that the local servers perform some of the functions implicated by the present principles, while the remote servers perform other ones of the functions implicated by the present principles. Hence, while wired connections are shown between the video camera 281 (described in further detail herein below) and the servers 210, other types of connection including, e.g., wireless connections and so forth can be used. The same applies to the wired connections between the servers 210 and the workplace machines, which can instead be wireless connections, and so forth. Moreover, while only some of the workplace machines are shown connected to the servers for the sake of illustration and ease of reviewing the drawing, it is envisioned that each workplace machine that poses a risk is connected for control in accordance with the teachings of the present principles.

The workplace hygiene and injury predictor 220C generates predictions of workplace hygiene and injury. In an embodiment, the predictions are made based on employee states that can include, but are not limited to, physical, cognitive, and emotional states. The employee states can be determined by the predictor 220C from, but not limited to, video data (e.g., captured by a video camera 281) and wearables analysis. The wearables 282 can include personal wearable instrumentation (e.g., smart watches, blood pressure monitors, and so forth) that measures various parameters of an employee. Moreover, the video data can be also be used to measure various parameters of an employee. The parameters can be heartrate, blood pressure, shakiness (trembling), crying, smiling, laughing, yelling, coughing, sneezing, and so forth. As is evident, such parameters can be indicative of stress, inattentiveness, sickness, or other employee state that can likely result in injury. Exemplary physical states include, but are not limited to, injury, abnormal pulse rate, abnormal body temperature, abnormal blood pressure, and so forth. A cognitive trait is defined as a representation of measures of a user's total behavior over some period of time (including, e.g., musculoskeletal gestures, speech gestures, eye movements, internal physiological changes, measured by, e.g., imaging devices, microphones, physiological and kinematic sensors, in a high dimensional measurement space) within a lower dimensional feature space. One or more embodiments use certain feature extraction techniques for identifying certain cognitive traits. Specifically, the reduction of a set of behavioral measures over some period of time to a set of feature nodes and vectors, corresponding to the behavioral measures' representations in the lower dimensional feature space, is used to identify the emergence of a certain cognitive trait over that period of time. Exemplary emotional states include, but are not limited to, sad, excited, and so forth.

In an embodiment, the predictor 220C categories the employee states, e.g., using unsupervised learning, from, e.g., video data/analysis and wearables data/analysis. In an embodiment, sequences of states are formed from the employee states. The sequences of states are formed from states based on, for example, temporal state information (e.g., one state temporally follows or precedes another state, and so forth), cognitive state information (e.g., one state cognitively follows or precedes another state), and so forth, for example by means of constructing a Hidden Markov Model, a Markov Network, a decision tree, or a set of topological descriptors of graphs constructed by associating these states with nodes and their transitions with edges. A sequence of states can be formed from different types of states.

In an embodiment, upon an industrial hygiene or injury event, the predictor 220C categorizes the sequences of states, for example, using supervised learning, to identify sequences of states that precede or do not precede the event.

In an embodiment, the predictor 220C compiles the sequence of states to form prediction states or predictions (with the compilation interchangeably referred to herein as a cognitive suite of workplace hygiene and injury predictors or "Cognitive WHIP".

The workplace schedule generator 220D generates a schedule using at least the outputs (predictions) of the cognitive whip. In an embodiment, the work schedule generator 220D generates a schedule to maintain a cumulative workplace risk below a predetermined threshold. Thus, the schedule can be specifically tailored with respect to a cumulative workplace risk.

The workplace resource manager 220E manages workplace resources in accordance with any schedules generated by the workplace schedule generator 220D. In an embodiment, the workplace resource manager 220E manages the workplace resources to maintain a cumulative workplace risk below a predetermined threshold. Thus, the workplace resources can be specifically managed with respect to a cumulative workplace risk.

The controller 210A implements decisions made by the workplace schedule generator 220D and/or the workplace resource manager 220E. The decisions can be related to scheduling and/or resource management (e.g., managing workers, machinery and their operation and use).

The memory 220B stores data relating to the present principles including, but not limited to, the aforementioned data and data generated to perform the present principles. In the case the workplace hygiene and injury predictor 220C, the workplace schedule generator 220D, and the workplace resource manager 220E are implemented as software or implemented in part in software, such software can be stored in the memory 220B. However, elements 220C, 220D, and 220E can also be implemented as least in part in hardware, including standalone devices, boards, integrated circuits, and so forth. In an embodiment, at least one of elements 220C, 220D, and 220E are implemented as application specific integrated circuits (ASICS). These and variations to the elements of system 200 are readily contemplated by one of ordinary skill in the art given the teachings of the present principles provided herein, while maintaining the spirit of the present principles.

FIG. 3 shows an exemplary method 300 for work schedule creation based on predicted and detected temporal and event based individual risk to maintain cumulative workplace risk below a threshold, in accordance with an embodiment of the present principles.

At step 305, categorize employee states using unsupervised learning from video and wearables analysis and form sequences of states from the employee states.

At step 310, upon the occurrence of an industrial hygiene or injury event, categorize the sequences of states using supervised learning to identify the sequences of states that precede or do not precede the event.

At step 315, compile sequences of states that predict events as a cognitive suite of workplace hygiene and injury predictors (also referred to herein as a "Cognitive WHIP").

At step 319, collect schedule related information. The schedule related information can include, but is not limited to, a list of operation requirements, a list of employees and their related data (e.g., work availability, medical history, prior work history (e.g., at the shift level), prior accident history, etc.), a list of work tasks and their related data (e.g., workplace machinery involved, worker expertise level involved, etc.), and so forth. The preceding information/data types and examples thereof are illustrative and, thus, other information/data types and/or examples can also be used while maintaining the spirit of the present principles.

At step 320, perform an analysis over a time window of at least a single worker shift, determining how risk fluctuates depending on worker shift schedules.

At step 325, perform an optimization over the Cognitive WHIP outputs (predictions) in order to determine a worker schedule with risk below a given threshold. In an embodiment, the optimization of step 325 is performed using (e.g., based on) results from the analysis performed at step 320. In an embodiment, step 325 is performed using one or more of a genetic algorithm, Tabu search, simulated annealing, and so forth.

At step 330, implement the schedule, which can include managing workplace resources based on the schedule. For example, workplace machinery may be enabled (allowed to be powered up) and so forth based on the schedule. Indicators (e.g., lights) can be used to highlight aspects of the schedule such as, but not limited to, which machine to use from among a set of machines, and so forth.

FIGS. 4-5 show another exemplary method 400 for work schedule creation based on predicted and detected temporal and event based individual risk to maintain cumulative workplace risk below a threshold, in accordance with an embodiment of the present principles.

At step 401, collect schedule related information. The schedule related information can include, but is not limited to, a list of operation requirements, a list of employees and their related data (e.g., work availability, medical history, prior work history (e.g., at the shift level), prior accident history, etc.), a list of work tasks and their related data (e.g., workplace machinery involved, worker expertise level involved, etc.), and so forth. The preceding information/data types and examples thereof are illustrative and, thus, other information/data types and/or examples can also be used while maintaining the spirit of the present principles.

At step 402, perform an optimization on the schedule related information to optimize the schedule related information for use in generating a workplace schedule. The optimization can be performed in consideration of one or more factors (e.g., constraints) that include, but are not limited to, a limited number of workers at the same time in each shift, a limited number of hours allocated to each worker, or a limited skill set for each task for safety perspective.

At step 403, generate an initial schedule based on the schedule related information (of step 401) and the optimization (of step 402).

At step 405, categorize employee states using unsupervised learning from video and wearables analysis and form sequences of states from the employee states.

At step 410, upon the occurrence of an industrial hygiene or injury event, categorize the sequences of states using supervised learning to identify the sequences of states that precede or do not precede the event.

At step 415, compile sequences of states that predict events as a cognitive suite of workplace hygiene and injury predictors (also referred to herein as a "Cognitive WHIP").

At step 420, determine, based on the Cognitive Whip outputs (predictions), if the cumulative workplace risk implicated by the schedule is optimal (below a predetermined threshold). If so, then the method proceeds to step 430. Otherwise, the method proceeds to step 425.

At step 425, perform an optimization over the Cognitive WHIP outputs in order to generate a worker schedule with risk below a given threshold. In an embodiment, step 425 is performed using one or more of a genetic algorithm, Tabu search, simulated annealing, and so forth.

At step 430, implement the schedule, which can include managing workplace resources based on the schedule. For example, workplace machinery may be enabled (allowed to be powered up) and so forth based on the schedule. Indicators (e.g., lights) can be used to highlight aspects of the schedule such as, but not limited to, which machine to use from among a set of machines, worker position in the workplace, and so forth.

Some of the many attendant advantages of the present principles include, but are not limited to, the following.
(1) A workforce scheduler in accordance with the present principles advantageously considers worker-specific and task-sequence-specific risk assessments.
(2) Shift scheduling can be formulated to minimize risk of worker injury with minimal side effects to factory productivity or other costs.
(3) Workers can be scheduled according to their expected interactions with other workers, equipment, or specific locations of the workplace.
(4) Minimization of risk can be achieved based on stochastic search and forward model of risk based on various scheduling options.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
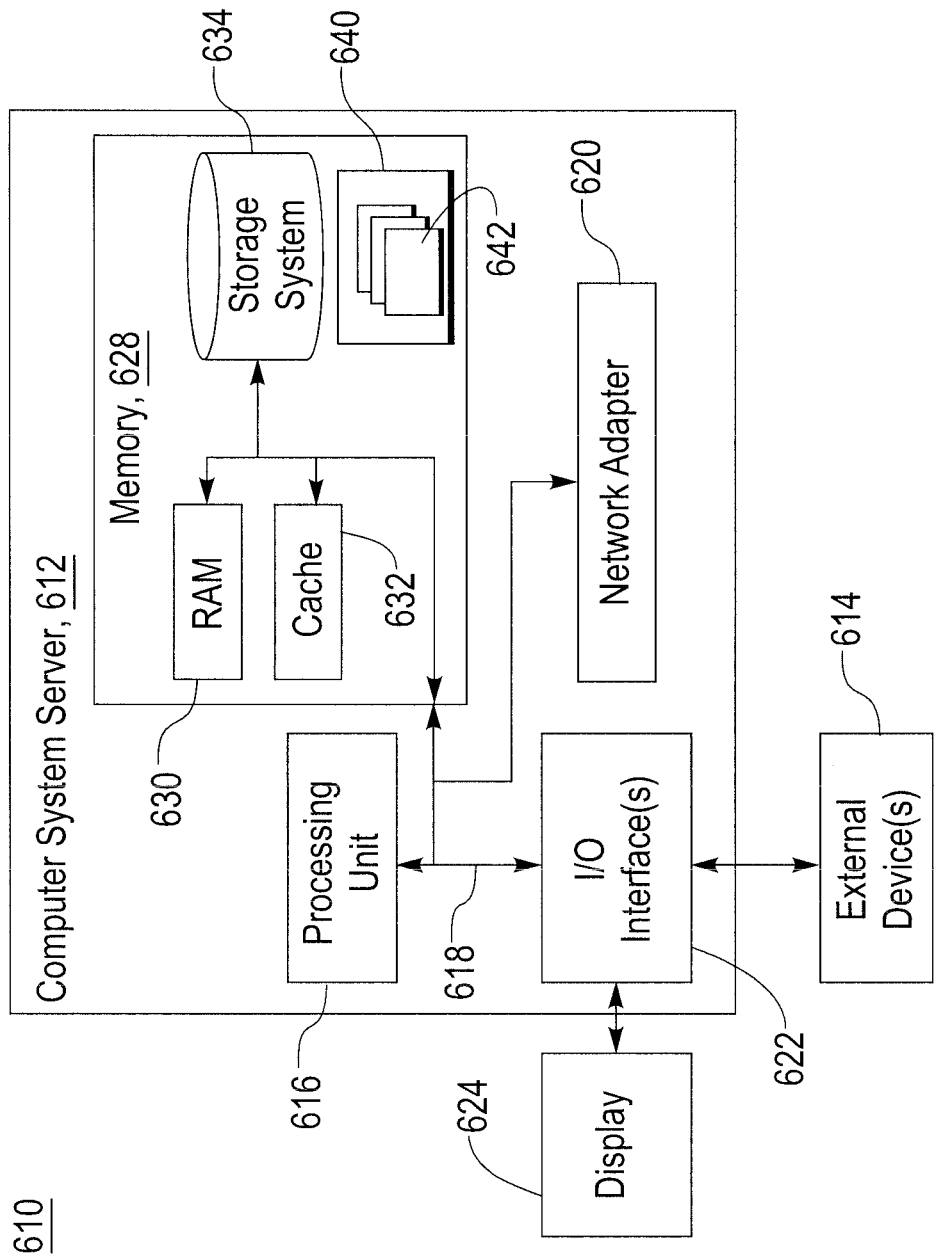
FIG. 6 shows an exemplary cloud computing node 610, in accordance with an embodiment of the present principles.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
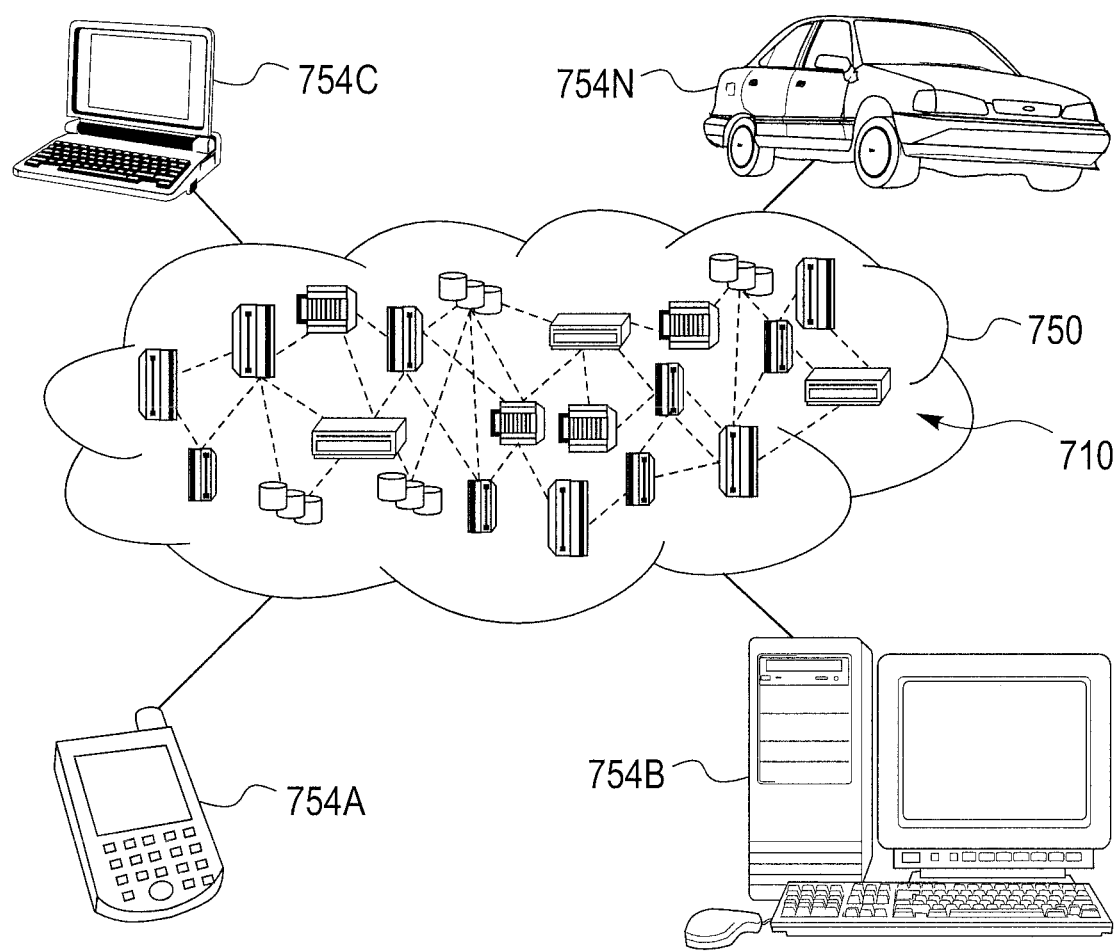
FIG. 7 shows an exemplary cloud computing environment 750, in accordance with an embodiment of the present principles.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
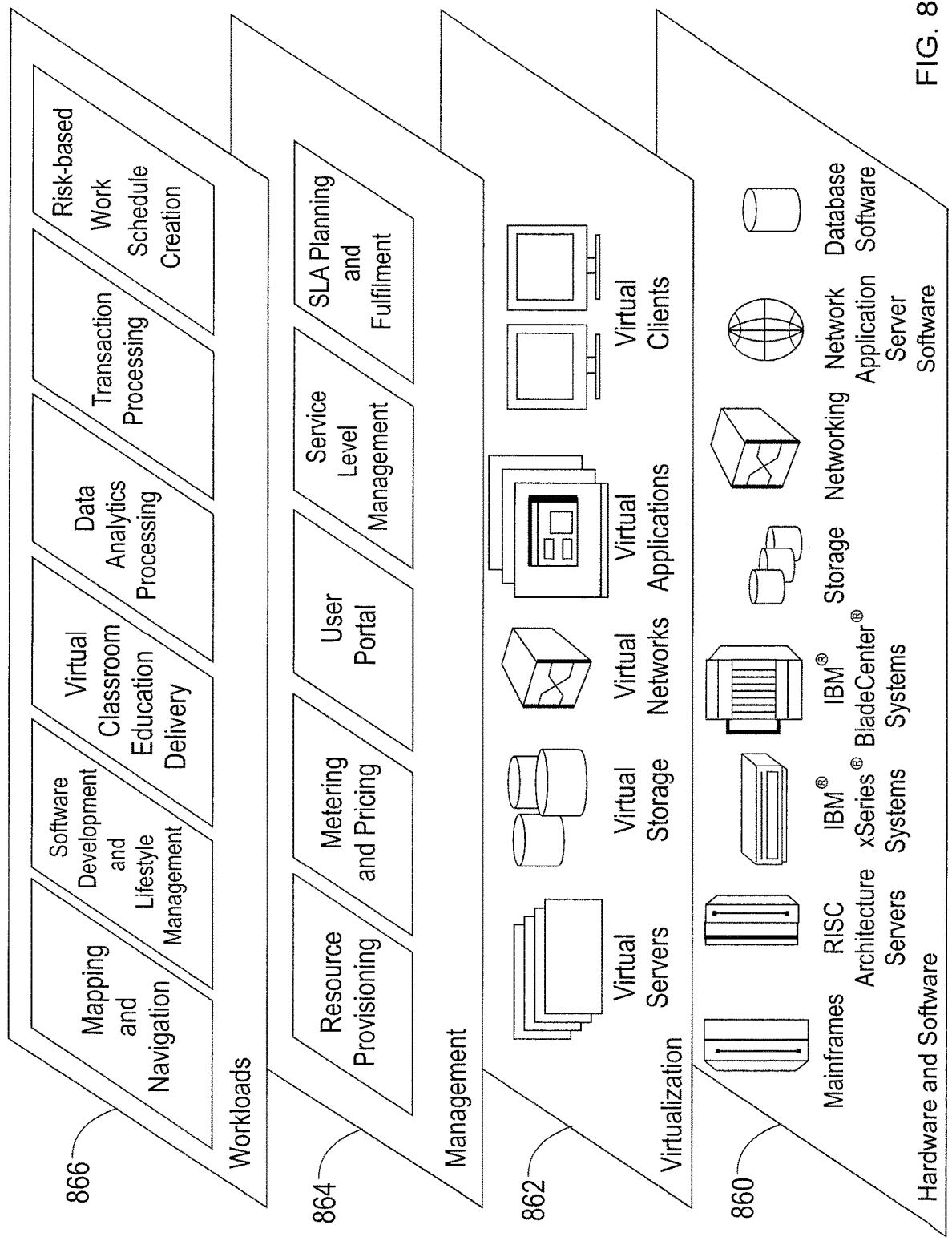
FIG. 8 shows exemplary abstraction model layers, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and risk-based work schedule creation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
generating, by a server having a processor, temporal and event based risk predictions for each of a plurality of workers at a workplace, using a prediction window of a work shift, the temporal and event based risk predictions including workplace hygiene and injury predictions that are based on physical, cognitive, and emotional states of the plurality of workers;
creating, by the server having the processor, a work schedule for the plurality of workers that is optimized to maintain a cumulative workplace risk below a given threshold, based on the temporal and event based risk predictions; and
controlling a hardware-based machine posing a physical risk to a user to reduce the physical risk responsive to the workplace hygiene and injury predictions,
wherein said generating step comprises using unsupervised learning from video and user sensor wearables analysis to form sequences of states from the physical, cognitive, and emotional states of the plurality of workers, and the method further comprises, upon the occurrence of an industrial hygiene or injury event, categorizing the sequences of states using supervised learning to identify the sequences of states that precede or do not precede the event and selectively initiating said controlling step responsive to a categorization, and wherein said managing step comprises indicating, using one or more lights, a workplace machine to use from among a set of workplace machines and a worker position in the workplace.

2. The method of claim 1, wherein the temporal and event based risk predictions are generated based on worker personal instrumentation data and workplace video data obtained over the prediction window of the work shift.

3. The method of claim 1, wherein said creating step comprises scheduling work activities for an actual work shift for a particular worker based on a time of day and a proximity of the particular worker to at least one of equipment and other workers.

4. The method of claim 1, wherein said creating step comprises scheduling work activities for an actual work shift for a particular worker based on work performance patterns for the particular worker over one or more previous work shifts and relative to break periods and meal periods.

5. The method of claim 1, wherein said creating step comprises scheduling worker location in the workplace, work tasks, and relationships between break periods and meal periods with respect to at least one of, the worker location in the workplace and the work tasks.

6. The method of claim 1, wherein said creating step comprises optimizing an allocation, an ordering and timings of all work activities across all of the plurality of workers with operational constraints during the work shift to reduce the cumulative workplace risk over an entirety of the work shift.

7. The method of claim 1, wherein said creating step comprises performing a stochastic search.

8. The method of claim 1, wherein the optimization is a global operation that considers all activities, workers and constraints simultaneously to reduce an overall risk of an entirety of the work shift.

9. The method of claim 1, wherein the schedule is generated to minimize the temporal and event based risk predictions.

10. The method of claim 1, wherein the schedule is generated for a given worker according to expected interactions between the given worker and other workers, between the given worker and workplace machinery, and between the given worker and specific locations of the workplace.

11. The method of claim 1, wherein said creating step comprises determining fluctuations in the temporal and event based risk predictions based on schedule variations.

12. The method of claim 1, further comprising managing workplace resources based on the schedule.

13. A computer program product for workplace schedule generation, the computer program product comprising a non-transitory computer readable storage medium having program instructions embodied therewith, the program instructions executable by a computer to cause the computer to perform a method comprising:
  generating, by a server having a processor, temporal and event based risk predictions for each of a plurality of workers at a workplace, using a prediction window of a work shift, the temporal and event based risk predictions including workplace hygiene and injury predictions that are based on physical, cognitive, and emotional states of the plurality of workers;
  creating, by the server having the processor, a work schedule for the plurality of workers that is optimized to maintain a cumulative workplace risk below a given threshold, based on the temporal and event based risk predictions; and
  controlling a hardware-based machine posing a physical risk to a user to reduce the physical risk responsive to the workplace hygiene and injury predictions,
  wherein said generating step comprises using unsupervised learning from video and user sensor wearables analysis to form sequences of states from the physical, cognitive, and emotional states of the plurality of workers, and the method further comprises, upon the occurrence of an industrial hygiene or injury event, categorizing the sequences of states using supervised learning to identify the sequences of states that precede or do not precede the event and selectively initiating said controlling step responsive to a categorization, and wherein said managing step comprises indicating, using one or more lights, a workplace machine to use from among a set of workplace machines and a worker position in the workplace.

14. The computer program product of claim 13, wherein said creating step comprises scheduling work activities for an actual work shift for a particular worker based on a time of day and a proximity of the particular worker to at least one of equipment and other workers.

15. The computer program product of claim 13, wherein said creating step comprises scheduling work activities for an actual work shift for a particular worker based on work performance patterns for the particular worker over one or more previous work shifts and relative to break periods and meal periods.

16. The computer program product of claim 13, wherein said creating step comprises scheduling worker location in the workplace, work tasks, and relationships between break periods and meal periods with respect to at least one of, the worker location in the workplace and the work tasks.

17. The computer program product of claim 13, wherein the optimization is a global operation that considers all activities, workers and constraints simultaneously to reduce an overall risk of an entirety of the work shift.

18. The computer program product of claim 13, wherein the schedule is generated to minimize the temporal and event based risk predictions.

19. A system, comprising:
  a server having a processor, for generating temporal and event based risk predictions for each of a plurality of workers at a workplace using a prediction window of a work shift, creating a work schedule for the plurality of workers that is optimized to maintain a cumulative workplace risk below a given threshold based on the temporal and event based risk predictions, and controlling a hardware-based machine posing a physical risk to a user to reduce the physical risk responsive to workplace hygiene and injury predictions that are based on physical, cognitive, and emotional states of the plurality of workers, wherein the temporal and event based risk predictions include the workplace hygiene and injury predictions, wherein the temporal and event based risk predictions are generated using unsupervised learning from video and user sensor wearables analysis to form sequences of states from the physical, cognitive, and emotional states of the plurality of workers, and the process further, upon the occurrence of an industrial hygiene or injury event, categorizes the sequences of states using supervised learning to identify the sequences of states that precede or do not precede the event and selectively initiates the controlling responsive to a categorization, and wherein said managing step comprises indicating, using one or more lights, a workplace machine to use from among a set of workplace machines and a worker position in the workplace.

* * * * *